United States Patent [19]
Delavaux

[11] Patent Number: 5,253,104
[45] Date of Patent: Oct. 12, 1993

[54] BALANCED OPTICAL AMPLIFIER

[75] Inventor: Jean-Marc P. Delavaux, Wescosville, Pa.

[73] Assignee: AT&T Bell Laboratories, Murray Hill, N.J.

[21] Appl. No.: 945,308

[22] Filed: Sep. 15, 1992

[51] Int. Cl.$^5$ .......................... H01S 3/00; G02B 6/26
[52] U.S. Cl. ..................................... 359/341; 359/174
[58] Field of Search ............... 359/134, 160, 174, 179, 359/341

[56] References Cited

U.S. PATENT DOCUMENTS

| | | | |
|---|---|---|---|
| 4,699,452 | 10/1987 | Mollenauer et al. | 359/174 |
| 4,963,832 | 10/1990 | Desurvire et al. | 330/4.3 |
| 5,005,937 | 4/1991 | Aida et al. | 359/179 |
| 5,007,698 | 4/1991 | Sasaki et al. | 350/96.15 |
| 5,008,887 | 4/1991 | Kafka et al. | 372/6 |
| 5,039,190 | 8/1991 | Blonder et al. | 359/541 |
| 5,039,199 | 8/1991 | Mollenauer et al. | 359/334 |
| 5,042,039 | 8/1991 | Edagawa et al. | 372/6 |
| 5,050,949 | 9/1991 | DiGiovanni et al. | 359/341 |
| 5,058,974 | 10/1991 | Mollenauer | 385/27 |
| 5,083,874 | 1/1992 | Aida et al. | 385/24 |
| 5,128,007 | 7/1992 | Zirngill | 359/341 |
| 5,136,420 | 8/1992 | Inagaki et al. | 359/341 |

OTHER PUBLICATIONS

"High Gain Two-Stage Amplification With Erbium-Doped Fibre Amplifier", *Electronics Letters*, May 10, 1990, vol. 26, No. 10, H. Masuda, A. Takada pp. 661–662.

"Dynamic Gain Equalization in Two-Stage Fiber Amplifiers", *IEEE Photonics Technology Letters*, vol. 2, No. 12, Dec. 1990, C. R. Giles and D. J. DiGiovanni pp. 866–868.

"Direct Mixing of Pump and Signal Waves into Erbium Doped Silica Fibers", *OFC '92*, Feb. 2–7, 1992 Postdeadline Papers, San Jose Convention Center, San Jose, California pp. 387–390.

"High Sensitivity Optical Pre-Amplifier . . . ", *Optical Amplifiers and Their Applications*, Optical Society of America IEEE/Lasers and Electro-Optics Society, Postdeadline Papers, Jun. 24–26, 1992 Santa Fe, New Mexico, Laming, Gnauck, Giles, Zervas, Payne pp. 57–61.

*Primary Examiner*—Nelson Moskowitz
*Attorney, Agent, or Firm*—Wendy W. Koba

[57] ABSTRACT

A balanced doped fiber optical amplifier is disclosed which requires only a single wavelength division multiplexer to provide pump and signal inputs to multiple amplifier stages. In particular, a first section of doped fiber is coupled to an "input" port of the multiplexer and a second section of doped fiber is coupled to an "output" port of the multiplexer. First and second pump signals are coupled to the remaining ports to provide a counter-propagating pump signal to the first doped fiber section and a co-propagating pump signal to the second doped fiber section. The parameters of each doped fiber section (e.g., length, dopant concentration, pump power, pump wavelength) may be individually tailored to provide the desired results (pre-amplification or power boosting, for example). A plurality of balanced optical amplifiers may be cascaded to provide multi-stage amplifiers, and the pump signal levels may be controlled to provide gain equalization. Preferably, the balanced amplifier is spliceless and comprises only two sections of doped fiber, the multiplexer formed as a coupling region between the fibers.

21 Claims, 6 Drawing Sheets

BALANCED OPTICAL AMPLIFIER

BACKGROUND OF THE INVENTION

1. Technical Field

The present invention relates to a doped fiber amplifier arrangement and, more particularly, to a amplifier arrangement requiring only a single multiplexer to provide communication and pump signal inputs to multiple amplifier stages.

2. Description of the Prior Art

In many lightwave communication systems there is an increasing need to provide direct optical amplification, in contrast to prior arrangements which utilized opto-electronic converters and electronic regenerators/repeaters to boost the signal power. Some applications include undersea voice and data communication systems, and terrestrial broadband distribution systems, such as CATV, fiber in the loop (FITL) or fiber to the home (FTTH). There is a considerable effort under way to develop rare earth doped fiber amplifiers to fill these needs. The rare earth doped optical amplifying fibers are know to have low cost, low noise properties, a relatively large bandwidth (which is not polarization dependent), minimal crosstalk problems, and relatively low insertion losses at the wavelengths which are used in these systems (for example, $\lambda_{signal}=1500$ nm). In use, rare earth doped optical fiber amplifiers are usually coupled end-to-end with an optical communication fiber and are further coupled (using a directional coupler) to a laser diode pump signal source. The presence of the pump signal (at a particular wavelength, for example, 980 nm or 1480 nm) with the communication signal within the rare earth doped fiber results in optical gain of the communication signal. Advantageously, the gain in independent of the propagation direction of the pump signal. Therefore, doped fiber amplifier arrangements may utilize pump signals propagating in either direction and are often described as utilizing "co-propagating pumps" or "counter-propagating pumps".

In most applications, multiple pump sources are utilized so that the loss of a single pump does not result in loss of amplification. See, for example, U.S. Pat. No. 5,050,949 issued to D. J. DiGiovanni et al. on Sep. 24, 1991 entitled "Multi-Stage Optical Fiber Amplifier", or U.S. Pat. No. 5,058,974 issued to L. F. Mollenauer on Oct. 22, 1991 entitled "Distributed Amplification for Lightwave Transmission System". A problem with these and other prior art arrangements is the need to provide a separate wavelength division multiplexer with each pump source. Conventional co- and counter-propagating amplifier designs use three out of four ports of a multiplexer device (bulk or fiber multiplexers, or integrated optic versions). A first input port is used to couple the pump signal, a second input port to couple the communication signal, and a first output port as a common port to carry both input signals to the amplifying medium (e.g., rare earth doped fiber). Generally, the second output port is blocked or used as a tap for the signal or pump. The use of a separate multiplexer with each pump necessarily increases overall optical loss, fabrication complexity and costs. Further, crosstalk between pumps may lead to gain and noise instability and, ultimately, catastrophic failure of the pumps. Insertion of additional isolators to protect the pumps from optical feedback is a solution to the crosstalk problem, but again increases the size, cost and complexity of the total amplifier.

Therefore, a need remains in the art for an optical fiber amplifier arrangement which provides the advantages of multiple pump sources, without unduly increasing the resulting cost or complexity of the fiber amplifier configuration.

SUMMARY OF THE INVENTION

The need remaining in the prior art is addressed by the present invention which relates to a doped fiber amplifier arrangement and, more particularly, to a doped fiber amplifier requiring only a single multiplexer to provide both communication and pump signal inputs to multiple amplifier stages.

In accordance with an exemplary embodiment of the present invention, a doped fiber optical amplifier is disclosed which utilizes a single multiplexer and two separate sections of doped fiber in a balanced configuration to provide an improved design. The communication signal passes through the first section of doped fiber and is coupled into a first input port of the multiplexer. The communication signal crosses signal paths within the multiplexer and exits at a first output port of the multiplexer. The second section of doped fiber is coupled to this first multiplexer output port. A pair of pump signals (which may derive from a single source which utilizes a ratio coupler to provide splitting) are coupled into the remaining two ports of the multiplexer so as to provide co- and counter-propagating pump signals input to both sections of doped fiber.

In an alternative embodiment, the balanced configuration described above may be altered to provide gain equalization by removing one pump source so as to leave the second, output section of doped fiber unamplified. Automatic leveling of the gain may be accomplished, alternatively, by actively adjusting the power level of at least one pump signal.

For one particular embodiment, the balanced optical amplifier configuration of the present invention may be utilized as a preamplifier to provide high gain with relatively low noise. Alternatively, the balanced optical amplifier of the present invention may be configured as a power booster with a relatively high conversion efficiency between input pump power and output signal power. Further, the preamplifier and power booster embodiments may be combined to form a cascaded configuration where the first stage is formed as a preamplifier and the second stage is formed as a power booster.

An advantage of the arrangement of the present invention is the ability to form the amplifier in a "spliceless" configuration. In particular, the first amplifier, multiplexer and second amplifier may be formed from two sections of doped fiber, with the multiplexer formed as a fused fiber coupler between the two doped fiber sections. The utilization of the pair of doped fibers in this fashion thus significantly reduces the size, cost and complexity of the amplifier, as well as significantly reducing the reflections and insertion losses within the amplifier.

Other and further variations of the balanced optical amplifier configuration of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
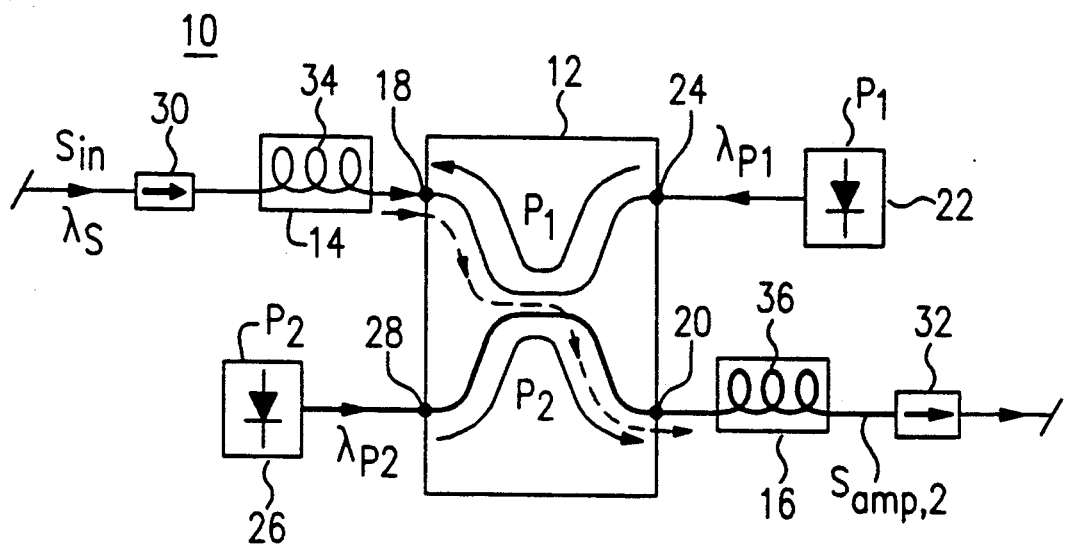
FIG. 1 illustrates a basic balanced optical amplifier formed in accordance with the present invention which utilizes a pair of separate pump sources.

A simplified block diagram of a basic balanced optical amplifier 10 is illustrated in FIG. 1. Amplifier 10 comprises a single wavelength division multiplexer 12 and is balanced by the utilization of a pair of amplifying sections, in particular, a first doped fiber amplifier 14 and a second doped fiber amplifier 16. First doped fiber amplifier 14 is coupled to a first port 18 of multiplexer 12 (referred to as an "input port") and second doped fiber amplifier 16 is coupled to a second port 20 of multiplexer 12 (referred to as an "output port"). The remaining multiplexer ports are coupled, as shown in FIG. 1, to a pair of pump sources, where the pump sources are commonly semiconductor laser diodes which emit radiation at a predetermined pump wavelength (e.g., $\lambda_{pump}$ approximately 980 nm or 1480 nm for erbium-doped fiber amplifiers). In particular, a first pump source 22 is illustrated as coupled to a third port 24 of multiplexer 12 and a second pump source 26 is illustrated as coupled to a fourth port 28 of multiplexer 12, where both of those ports are thus utilized as input ports.

Balanced optical amplifier 10 of FIG. 1, as illustrated, thus provides for the combination of pump signal and an applied communication signal in a balanced, symmetric fashion. In operation, communication signal $S_{in}$ ($\lambda_s$ approximately 1550 nm) first passes through an input isolator 30 and is coupled into first fiber amplifier 14. Input signal $S_{in}$ subsequently passes through first fiber amplifier 14 and is coupled by first port 18 into multiplexer 12. Multiplexer 12 is configured so as to allow the wavelength $\lambda_s$ of signal $S_{in}$ to cross signal paths within multiplexer 12 and exits second port 20 of multiplexer 12 (indicated by the dotted line in FIG. 1) to couple into second fiber amplifier 16.

Amplification is provided in first fiber amplifier 14 by the presence of a pump signal $P_1$ from first pump source 22 within first doped fiber amplifier 14. The direction of propagation of pump signal $P_1$ through multiplexer 12 is illustrated in FIG. 1. As mentioned above, the propagation direction of the pump signal through the doped fiber does not affect the amplification of the communication signal. Input isolator 30 blocks second pump signal $P_1$ from propagating further back along the signal path. Therefore, input signal $S_{in}$ experiences an amplification within first amplifier 14 by virtue of the presence of counter-propagating first pump signal $P_1$. The output from first fiber amplifier, denoted $S_{amp,1}$, is then passed through multiplexer 12 as described above and coupled into second doped fiber amplifier 16. The pump signal for second doped fiber amplifier 16 is provided, as shown in FIG. 1, by a pump signal $P_2$ from second pump source 26. Pump signal $P_2$ propagates through multiplexer 12 as shown in FIG. 1 and is thus provided as a co-propagating pump signal for second fiber amplifier 16. Signal $S_{amp,1}$ is thus further amplified within second doped fiber amplifier 16 and provides the final amplified output signal from balanced optical amplifier 10, denoted $S_{amp,2}$ in FIG. 1. An output isolator 32 is utilized to block reflected signals along the transmission path from re-entering optical amplifier 10.

An advantage of balanced optical amplifier 10 of the present invention is the ability to form the amplifier as a "spliceless" unit (between input isolator 30 and output isolator 32). That is, amplifier 10 may be formed of two separate sections of rare earth-doped fiber (e.g., erbium-doped or praseodymium-doped fiber). As shown in FIG. 1, balanced optical amplifier 10 may comprise a first section of doped fiber 34 (forming first amplifier 14, multiplexer 12 between ports 18 and 22, and optical path to pump source 22) and a second section of doped fiber 36 (forming the optical signal path from second pump source 26, multiplexer 12 between ports 28 and 20, and second amplifier 16). The crossing of amplifier communications signal $S_{amp,1}$ within multiplexer 12 is provided by coupling together fibers 34 and 36 (for example, as a fused fiber coupler, polished/exposed core coupler, evansescent field coupler, etc., these and others being referred to hereinafter as a "coupler"). The utilization of only fiber sections 34 and 36 to form amplifier 10 thus obviously reduces the size, cost and complexity of the amplifier design. Further, without the need to form splices between the separate components (amplifier, multiplexer, pump source), insertion loss and reflection with amplifier 10 are significantly reduced.

As is well-known in the are, optical amplification within a doped amplifier occurs at predetermined signal wavelengths (for example, $\lambda_s = 1550$ nm) in the presence of pump signals at certain wavelengths (for example, $\lambda_p = 980$ nm or 1480 nm). As illustrates in FIG. 1, pump sources 22 and 26 may provide pump signals at the same wavelength (i.e., $\lambda_{p1} = \lambda_{p2} = 980$ nm). Such an arrangement would be the case for a true "sparing" amplifier (where the loss of a single pump source does not result in the total loss of amplification) or, as will be discussed below in association with FIG. 2, for the condition where a signle pump source is used to provide both pump signals $P_1$ and $P_2$. In general, however, $\lambda_{P1}$ may be different from $\lambda_{P2}$. In fact, since each pump wavelength offers different benefits, each may be used to form a balanced optical amplifier which exhibits attributes of both pump sources. Referring to FIG. 1, for example, pump source 22 may provide a pump signal $P_1$ at $\lambda_{P1} = 980$ nm into first doped fiber amplifier 14. Using a 980 nm pump signal is known to provide relative high gain with relative low noise—ideal conditions for a pre-amplifier application. Second pump source 26, alternatively, may provide a second pump signal $P_2$ at $\lambda_{P2} = 1480$ nm into second doped fiber amplifier 16. Pumping at 1480 nm is known to result in a full population inversion within the doped fiber, providing a relatively high conversion efficiency (for example, 1 mW of pump provides 0.8 mW of increased communication signal level)—ideal for power boosting applications. Thus, the combination of pump signal $P_1$ at $\lambda_{P1} = 980$ nm and pump signal $P_2$ at $\lambda_{P2} = 1480$ nm provides an overall balanced optical amplifier 10 with a relatively low amplified spontaneous emission (ASE) (low noise in amplifier 14 coupled with high conversion efficiency in amplifier 16). An additional isolator may be inserted in the signal path between first amplifier 14 and second amplifier 16 to prevent reflected pump signals, as well as any amplified spontaneous emission, from re-entering amplifiers. Further, various parameters of doped fiber amplifiers may be controlled so as to provide desired amplifier characteristics. For example, these parameters may include dopant concentration within the fiber (and, further, a gradient in dopant distribution within the fiber), the length 1 of the doped fiber section, pump wavelength $\lambda_P$, and pump power. Various combinations of these and other parameters may be controlled by the user to provide the desired results (e.g., maximum gain, power boosting, etc.).

Figure 2:
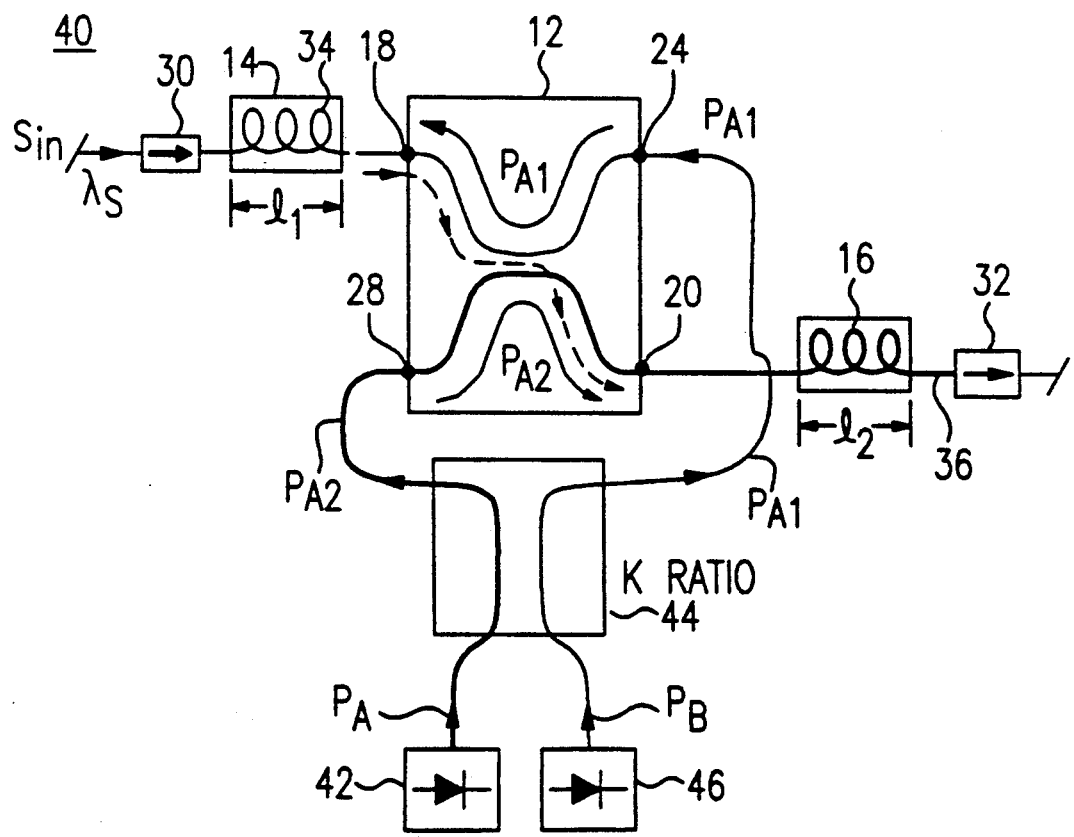
FIG. 2 illustrates an alternative embodiment of a basic balanced optical amplifier configuration which utilizes a k ratio coupler in association with the pair of pump sources.

An alternative embodiment of the balanced optical amplifier of the present invention is illustrated in FIG. 2. Balanced optical amplifier 40 utilizes a number of the same components as amplifier 10 of FIG. 1, as indicated by the utilization of the same reference numerals. Amplifier 40 differs from amplifier 10 in the means utilized to provide the pump signals to first and second doped fiber amplifers 14 and 16. In fact, for the arrangement of balanced amplifier 40, a single pump source may be utilized to provide both the counter-propagating pump signal $P_1$ for first fiber amplifier 14 and the co-propagating pump signal $P_2$ for second fiber amplifier 16. Referring to FIG. 2, a pump source 42, providing a pump signal $P_A$, is illustrated as being applied as an input to a k ratio coupler 44. Coupler 44 may comprise, simply, a fused fiber coupler, a lithium-niobate coupler, or any other desired passive or active coupler. As is well-known in the art, coupler 44 functions to split the power level of input signal along the pair of output signal paths. For a conventional 3 dB coupler, the split is 50:50, providing a pair of equal power level signals along each path. As mentioned above, pump power is one parameter which may be controlled to provide desired amplifier characteristics. Referring to FIG. 2, the pair of output pump signals for amplifier 40, denoted $P_{A1}$ and $P_{A2}$, are formed as separate outputs from coupler 44, where the respective power levels of each pump are a function of the ratio of coupler 44 (i.e., the value of "k"). As shown, first pump signal $P_{A1}$ is coupled to third port 24 of multiplexer 12 and is used as the counter-propagating pump signal for first fiber amplifier 14. Second pump signal $P_{A2}$ is coupled to fourth port 28 of multiplexer 12 and is used as the co-propagating pump signal for second fiber amplifier 16. The operation of amplifier 40 is essentially identical to that of amplifier 10 discussed above in association with FIG. 1.

As discussed above, the use of a single source to provide amplification is often not a desirable condition, since failure of the pump source results in complete loss of amplification. Preferably, therefore, a second pump source (operating at essentially the same wavelength) is utilized, either in a back-up (spare) mode, or in an arrangement where both sources are used simultaneously. FIG. 2 further illustrates the inclusion of such a second pump source 46, which is applied as a second input to coupler 44. Second pump source 46 provides a pump signal $P_B$, which is split by coupler 44 into a pair of output signals in the same manner as signal $P_A$ discussed above. Second pump source 46 may remain idle during the operation of the amplifier with first pump source 42, being utilized only upon failure of first source 42. Alternatively, as mentioned above, second source 46 may be used simultaneously with first source 42. As will be discussed below, the utilization of both pumps may result in improved performance of the balanced optical amplifier by doubling the pump power supplied to the amplifier arrangement. Advantageously, balanced optical amplifier 40, as shown, may also comprise only a pair of doped fiber sections 34 and 36 (disposed between isolators 30 and 32) and coupled together (e.g., fused, polished, etc.) to form both multiplexer 12 and coupler 44. Again, such a "spliceless" configuration is considered to be more cost effective and robust, with lower insertion loss and reflection than discrete versions.

The balanced optical amplifier configuration of the present invention as described above in FIGS. 1 and 2 provides advantages over prior art configurations with respect to relaxed constraints on both loss and crosstalk. For example, a relatively high insertion loss for input signal $S_{in}$ results in a reduction of gain, but does not degrade the noise figure since both the signal and the amplified spontaneous emissions (ASE) are attenuated by similar amounts. Crosstalk is minimized to the extent that multiplexer 12 is able to prohibit the pair of pump signals from exchanging optical signal paths. For the case of $\lambda_{pump} = 980$ nm, conventional wavelength division multiplexers exhibit isolation between adjacent waveguides of better than 25 dB. Further, by controlling various parameters of the doped fiber amplifiers, for example, the lengths of first doped fiber amplifier 14 ($l_1$) and second doped fiber amplifier 16 ($l_2$), optimum pumping for a variety of applications (e.g., preamplification, power boosting $\lambda_{P1} \neq \lambda_{P2}$) may be achieved.

Figure 3:
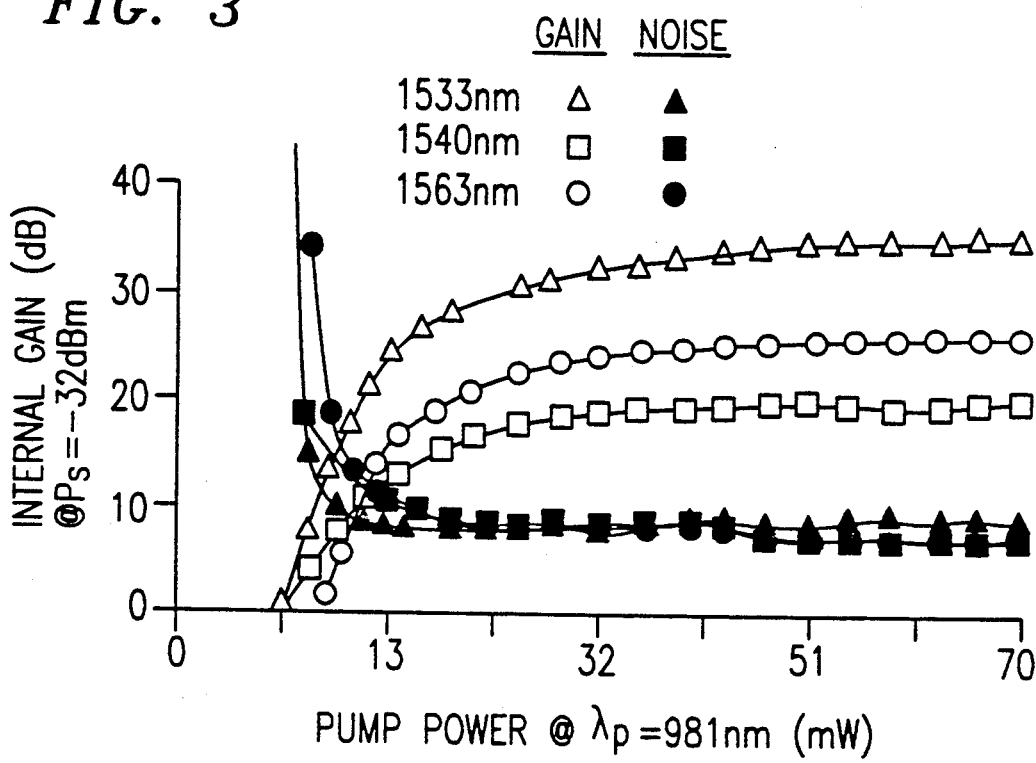
FIG. 3 is a graph illustrating the internal gain and noise figure (as a function of pump power and drive current) for the arrangement as illustrated in FIG. 2.

FIG. 3 illustrates the internal gain and noise figure as a function of pump power for the arrangement as illustrated in FIG. 2. The power of communication signal $S_{in}$ is assumed to be $-32$ dBm and the pump wavelength is assumed to be 981 nm. The measurements as shown were made at three different signal wavelengths ($\lambda_s$): 1533 nm, 1548 nm and 1563 nm, where these three wavelengths correspond to three distinct regions of the amplifier gain spectra. The signal gain, as shown, reproduces the shape of the amplified spontaneous emission, with a maximum gain of approximately 34 dB for $\lambda_s = 1533$ nm. The noise figure, in the linear regime, is shown to vary from 3 to 4 dB (depending upon $\lambda_s$), indicating that essentially complete population inversion is achieved in both amplifiers.

Figure 4:
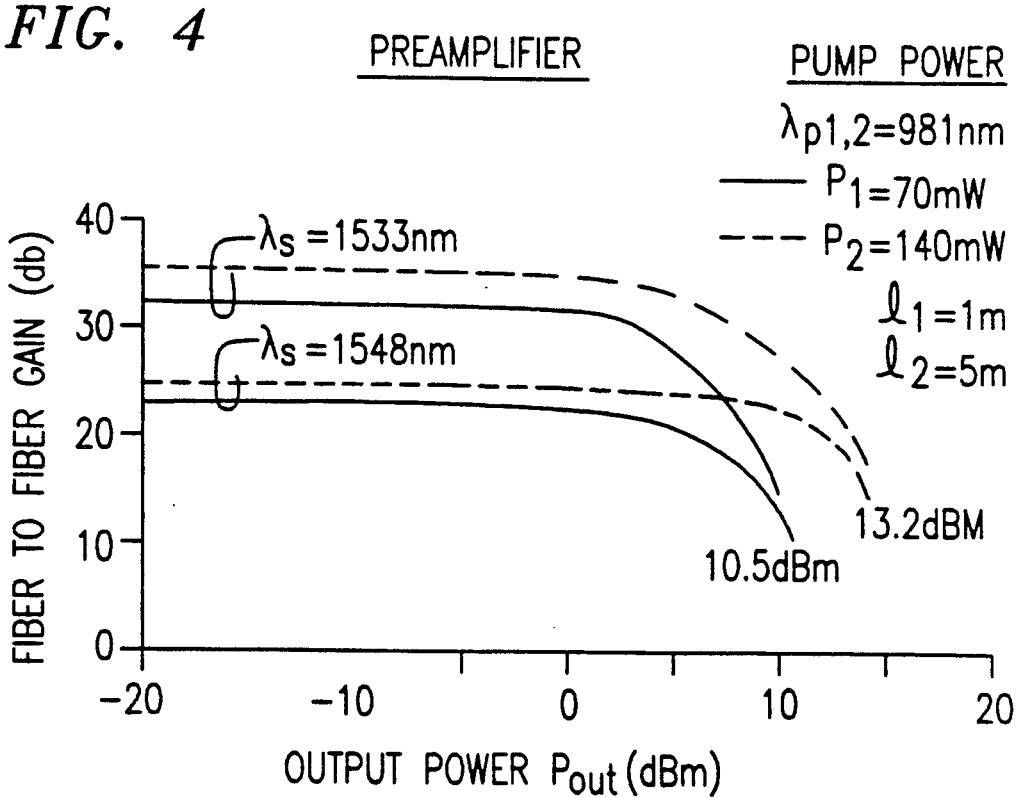
FIG. 4 is a graph illustrating the saturation characteristics of a balanced optical amplifier of the present invention when utilized as a preamplifier.

As mentioned above, the balanced optical amplifier configuration of the present invention may be used as a preamplifier, where the important criteria for a preamplifier relative high gain (e.g. >20 dB) and low noise (e.g., approximately 3 dB). These objectives may be achieved by limiting the amplification within first fiber amplifier 14, in one example by using a section of doped fiber with a length $l_1$ less than the length $l_2$ of second doped fiber amplifier 16 (alternatively, pump power and/or dopant concentration may be latered to limit amplification). For example, $l_1$ may be approximately 1 m and $l_2$ may be 5 m. The saturation characteristics for such a preamplifier configuration are illustrated in FIG. 4 for $\lambda_s$ at both 1533 nm and 1548 nm. The solid curves are associated with a pump power of 70 mW and correspond to the use of a single pump source (e.g., pump source 42 of FIG. 2) to provide both the co- and counter-propagating pump signals. The dashed curves are associated with a pump power of 140 mW and correspond to the simultaneous use of a pair of pump sources (e.g., pump sources 42 and 46 of FIG. 2).

Figure 5:
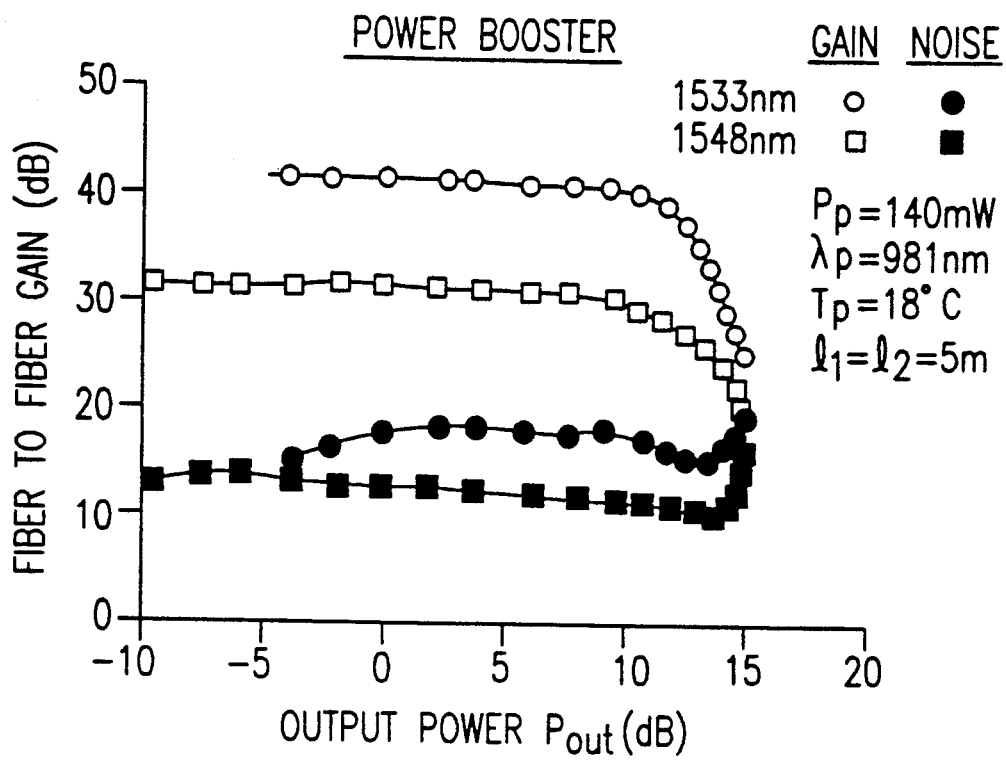
FIG. 5 is a graph illustrating the performance of a power booster configuration of the balanced optical amplifier of the present invention.

As discussed above, the balanced optical amplifier of the present invention may also be used as a power booster by, for example, increasing the gain within the first doped fiber amplifier region. The gain may be increased by, for example, increasing the length $l_1$ of first doped fiber amplifier 14, where $l_1$ may be increased to be essentially identical to that of second doped fiber amplifier 16 ($l_1 = l_2 = 5$ m). Alternatively, pump power and/or dopant concentration may be altered. FIG. 5 illustrates gain and noise figure curves for an exemplary power booster of the present invention. As indicated, the gain and noise figures were measured for a pump power of 140 mW (i.e., pump sources 42 and 46 used simultaneously) at a pair of signal wavelengths, $\lambda_s$, of 1533 nm and 1548 nm. The gain curves for both wavelengths are shown to converge in the saturation regime. Both noise figure curves show a dip in noise at the onset of saturation.

Figure 6:
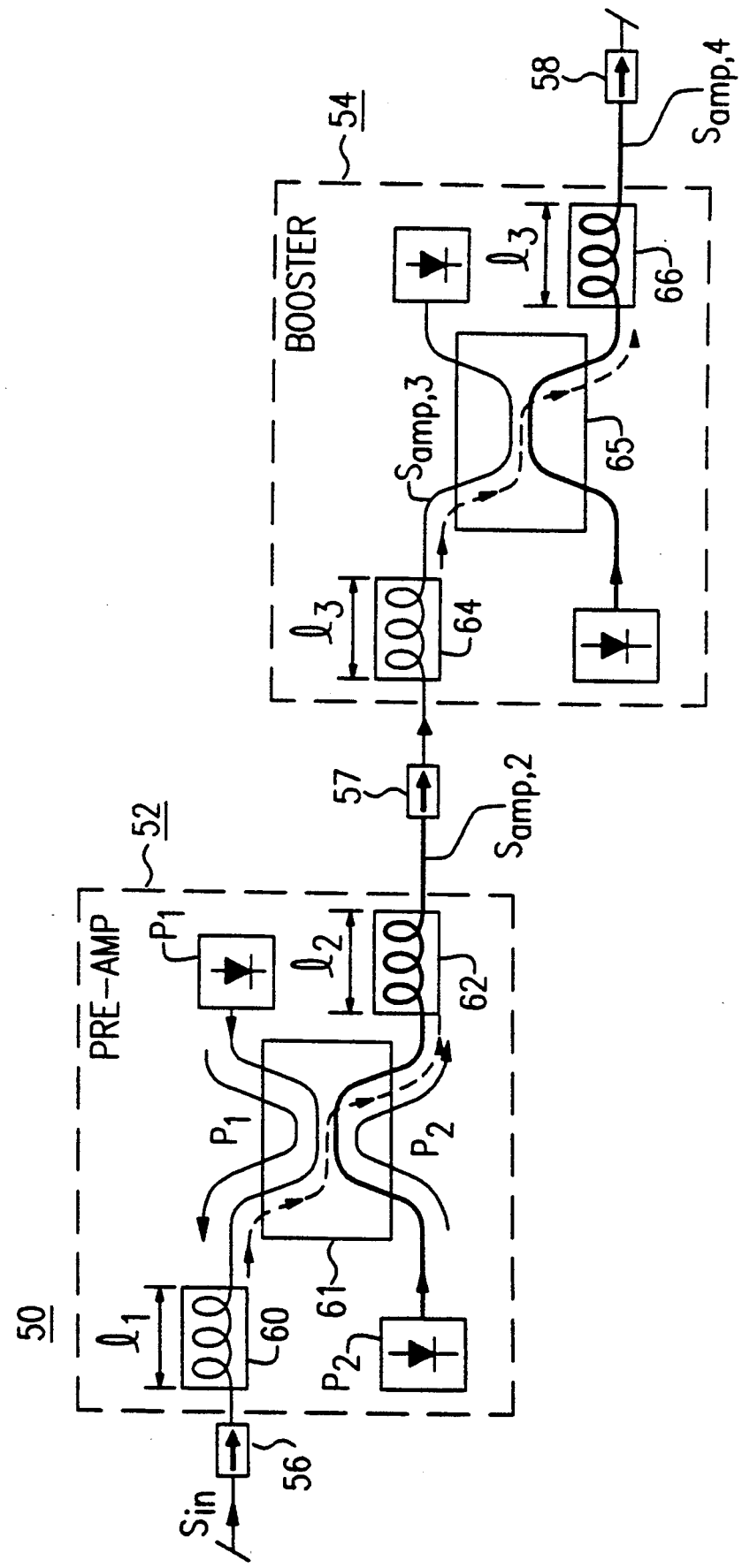
FIG. 6 illustrates a cascaded balanced optical amplifier of the present invention which includes both a preamplifier and a power booster.

FIG. 6 illustrates an exemplary cascaded balanced optical amplifier arrangement 50 formed in accordance with the present invention. Balanced optical amplifier 50 includes a first amplifier stage 52, configured to perform as a preamplifier, and a second amplifier stage 54, configured to perform as a power booster. A first isolator 56 is provided at the input to amplifier arrangement 50, a second isolator 57 is provided between first stage 52 and second stage 54, and a third isolator 58 is provided at the output of amplifier arrangement 50. Preamplifier 52 functions in a manner similar to the preamplifier arrangement described above, where the length $l_1$ of first amplifier 60 is chosen in this particular example to be less than the length $l_2$ of second amplifier 62 (to limit amplification within first amplifier 60). The propagation directions of the communication signal $S_{in}$ and pump signals $P_1$ and $P_2$ are as indicated in FIG. 6. Amplified message signal $S_{amp,2}$ at the output of first amplifier stage 52 passes through isolator 57 and is subsequently provided as an input to power booster amplifier stage 54. Second amplifier stage 54 is configured such that first amplifier 64 and second amplifier 66 provide essentially identical gain, where the length of each fiber amplifier is denoted as $l_3$ in FIG. 6. Signal $S_{amp,2}$ is thus applied as an input to power booster 54 and amplifiers within first amplifier 64 to form signal $S_{amp,3}$. Signal $S_{amp,3}$ subsequently passes through multiplexer 65 and is amplified a last time within second amplifier 66 to form output signal $S_{amp,4}$.

Figure 7:
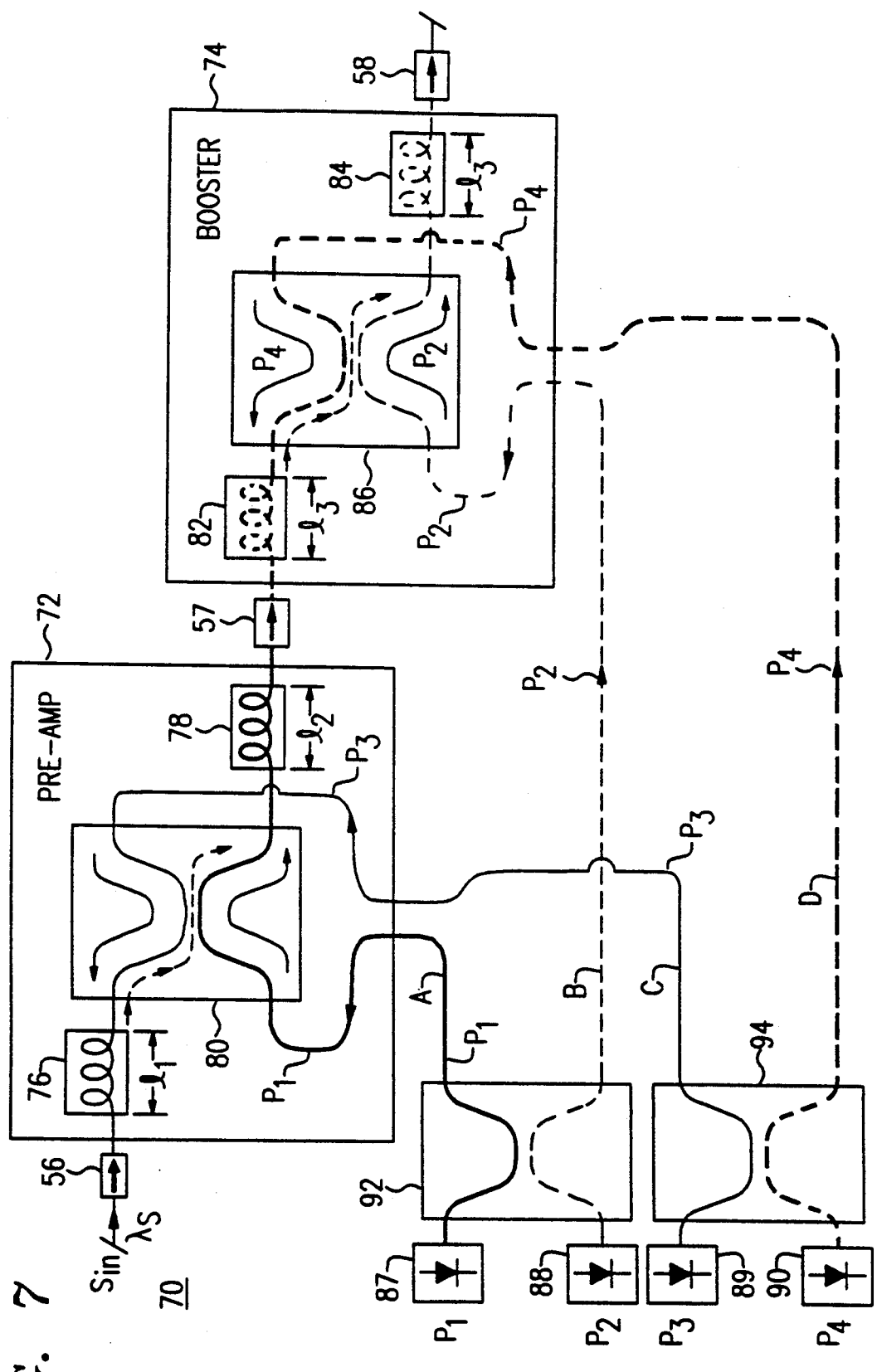
FIG. 7 illustrates a "spliceless" cascaded balanced optical amplifier formed in accordance with the teachings of the present invention.

A "spliceless" version of a cascaded balanced optical amplifier 70 is shown in FIG. 7. As with cascaded balanced optical amplifier 50 described above, amplifier 70 consists of a pre-amplifier first stage 72 and power booster second stage 74. Isolators 56, 57 and 58 are positioned as shown. In this particular configuration, pump signals are distributed and coupled between stages so as to both share pump sources and provide a sparing arrangement. As shown, pre-amplifier 72 includes a first amplifier 76 of length $l_1$, a fiber multiplexer 80, and a second amplifier 78 of length $l_2$, where $l_1 < l_2$. Power booster amplifier 74, similarly, comprises a first doped fiber amplifier 82 of length $l_3$, a fused fiber multiplexer 86 and a second doped fiber amplifier 84, also of length $l_3$. The pump signals are provided to all four doped fiber amplifiers by a set of pump sources 87, 88, 89 and 90. As shown in FIG. 7, sources 87 and 88 are coupled within a directional coupler 92 to provide a pair of output pump signals, referred to as $P_1$ and $P_2$. Similarly, pump sources 89 and 90 are combined within a directional coupler 94 to provide a pair of pump signals $P_3$ and $P_4$. As discussed above, a single pump source, when passed through a coupler such as 92 or 94, will provide a pair of output signals. Therefore, pump sources 88 and 90 may be only "spare" sources, and in one configuration need not be used. In a further embodiment (not shown), a single pump source may be used as the only pump for all of the amplifiers, where the single pump signal is distributed through a series of couplers to all of the doped fiber amplifiers.

Cascaded balanced optical amplifier 70 is referred to as a "spliceless" amplifier in that only four sections of doped fiber are required to perform all necessary functions (except isolation). Referring to FIG. 7, these four sections are denoted as A, B, C and D. In particular, doped fiber A functions as: (a) a signal path to pump source 87; (2) a first signal path through coupler 92; (3) a signal path for pump signal $P_1$; (4) a first signal path through multiplexer 80; and, lastly, (5) second doped fiber amplifier 78 of pre-amplifier 72. In a similar manner, doped fiber B functions as: (1) a signal path to pump source 88 (if present); (2) a second signal path through coupler 92; (3) a signal path for pump signal $P_2$; (4) a first signal path through multiplexer 86 and, lastly, (5) second doped fiber amplifier 84 of power booster amplifier 74. The remaining fibers C and D form similar components as indicated in FIG. 7.

The issue of gain equalization over the communication bandwith of interest (i.e., 1530-1560 nm) within doped fiber amplifiers is another concern which may be addressed by the balanced optical amplifier configuration of the present invention. In particular, the irregular fluorescence spectrum of the rare earth dopants may result in uneven gain over the communication bandwith of interest. Efficient smoothing of the overall gain in the band 1530-1560 nm has been demonstrated by using a notch filter within the amplifier. Alternatively, passive equalization may be achieved in accordance with the teachings of the present invention by using the absorption characteristics of an un-pumped length of doped fiber. In particular, the increased absorption of an un-pumped erbium-doped fiber corresponds to a gain peak at 1530 nm. Therefore, as long as the communication signal power and spontaneous emission self-pumping are below the intrinsic saturation power of the fiber, the fiber will preferentially absorb the shorter wavelengths of the gain spectrum. Thus, by removing the pump signal from the fiber, the gain peak at the short wavelength (1531 nm) will be reduced, reducing the net amplifier gain ripple.

Figure 8:
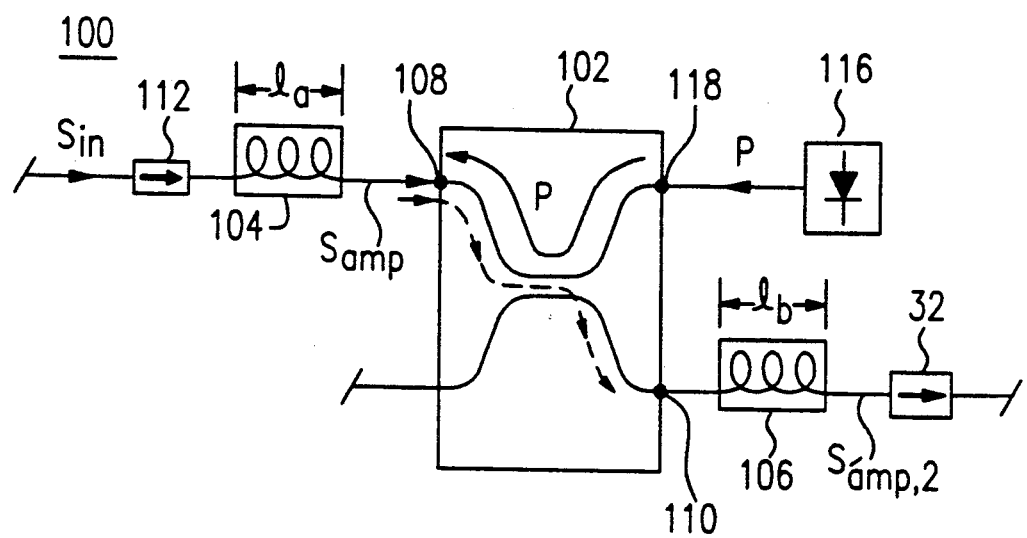
FIG. 8 illustrates a gain equalized balanced optical amplifier configuration of the present invention.

FIG. 8 illustrates an exemplary balanced optical amplifier 100 of the present invention which provides passive gain equalization as described above. As shown, amplifier 100 comprises a multiplexer 102, a first doped fiber amplifier 104 and a second doped fiber amplifier 106. Similar to arrangements described above, first doped fiber amplifier 104 is coupled to a first port 108 of multiplexer 102 (an "input" port) and second doped fiber amplifier 106 is coupled to a second port 110 of multiplexer 102 (an "output" port). A pair of optical isolators 112,114 are disposed at the input and output of amplifier 100. A communication signal $S_{in}$ is coupled to amplifier 100, as shown, and propagates through amplifier 100 as indicated by the dotted directional arrow. First doped fiber amplifier 104 is counter-pumped by a pump signal P from a pump source 116, which is coupled to port 118 of multiplexer 102 and propagates in the direction shown in FIG. 8. Second doped fiber amplifier 106 remains un-pumped for this particular application, and is chosen to be a length which provides the desired amount of gain equalization without severely reducing the overall gain of amplifier 100. In operation, therefore, a communication signal $S_{in}$ will experience gain as it passes through pumped first doped fiber amplifier 104 to form amplified signal $S_{amp}$. Amplified signal $S_{amp}$ subsequently passes through multiplexer 102 and enters second amplifier 106 (which remains un-pumped). The gain of signal $S_{amp}$ will then be somewhat attenuated within second amplifier 106, which is chosen to be a length which provides the required degree of "flattening" without unduly reducing the overall gain. For example, first amplifier 104 may be formed to comprise a length $l_a$ of approximately 5 m and second (unpumped) amplifier may be formed to comprise a length $l_b$ of approximately 2.5 m. In this particular configuration, therefore, first amplifier 104 functions as a pre-amplifier, providing low noise (approximately 3 db) and high gain. The length $l_b$ of second amplifier 106 is chosen to achieve minimum gain ripple in the wavelength band of interest.

Figure 9:
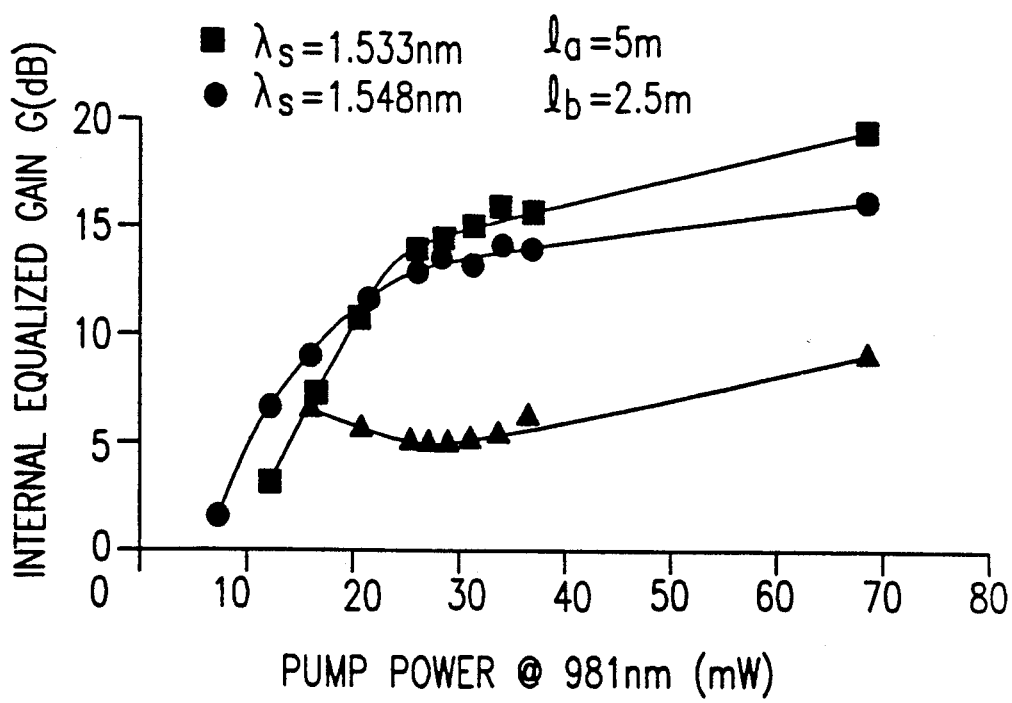
FIG. 9 is a graph illustrating both gain and gain ripple for the gain equalized embodiment of FIG. 8.

FIG. 9 contains curves illustrating both gain and gain ripple for the equalized balanced optical amplifier 100 of FIG. 8. The gain and gain ripple were measured for two signal wavelengths $\lambda_s$: 1533 nm and 1548 nm over a pump power range of less than 10 mW to approximately 70 mW. The gain curves at both signal wavelengths illustrate that the equalization works well over a wide range of pump powers. Similarly, the gain ripple is shown as remaining relatively constant, with a maximum value of 2.5 dB for 30 mW and 4.1 dB for 70 mW.

Figure 10:
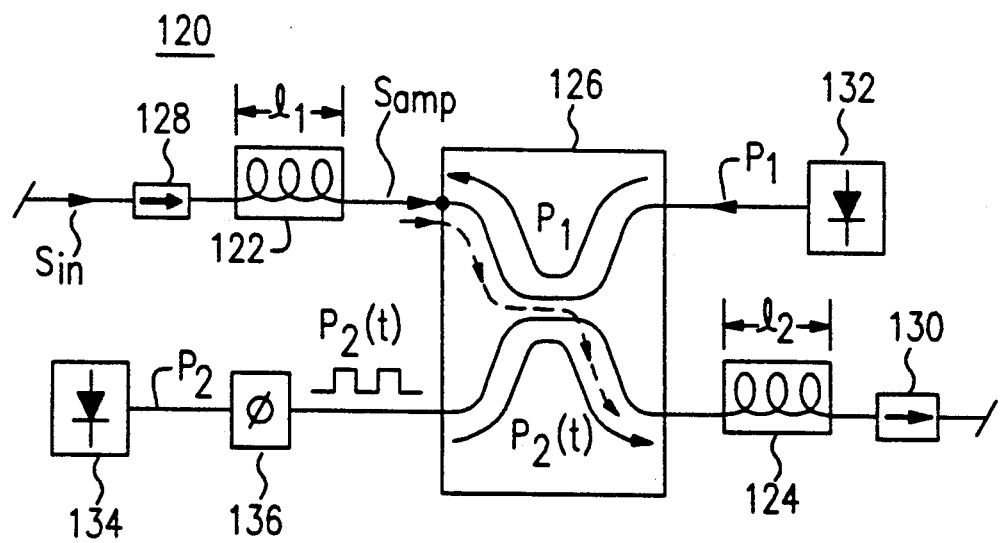
FIG. 10 illustrates an automatic level controlled embodiment of the balanced optical amplifier configuration of the present invention.

In contrast to leaving the second amplifier unpumped, the pump signal input to this amplifier may be controlled (turned "on" and "off", for example), to modify the gain/loss characteristic of the amplifier. FIG. 10 illustrates an exemplary amplifier arrangement 120 which provides automatic gain level control in such a manner. Similar to the arrangments described above, amplifier 120 comprises a first doped fiber amplifier 122 and second doped amplifier 124, with a wavelength division multiplexer 126 disposed between amplifiers 122,124 to provide for required propagation directions of the communication signal $S_{in}$ and pump signals. Isolators 128 and 130 are disposed at the input and output as shown. A first pump source 132 is coupled to multiplexer 126 so as to provide a pump signal $P_1$, as shown, as a pump signal input to first amplifier 122. First amplifier 122 is chosen to comprise a length $l_1$ which provides high gain and low noise to input signal $S_{in}$. As with the other arrangements, therefore, constant pumping with signal $P_1$ generates an amplifier signal $S_{amp}$ at the output of first amplifier 122.

A second pump source 134 is also illustrated in FIG. 10. In contrast to the other arrangements described above, however, source 134 is not directly coupled to multiplexer 126, but instead passes through a modulator 136 which forms a pump signal which varies as a function of time, denoted $P_2(t)$ in FIG. 10. The duty cycle of signal $P_2(t)$ is then controlled so as to provide for the desired amount of gain/loss within second amplifier 124 (i.e., the low the duty cycle, the lower the pump power, with 0% representing no signal, 50% half power and 100% representing full power). In fact, the amplified output signal from second amplifier 124 may be fed back as an input to modulator 136 (not shown) to provide for dynamic correction and, therefore, automatic gain level control. Further, pump signal $P_1$ applied to first amplifier 122 may also be modulated to provide additional gain/loss control capabilities.

As with the other arrangements described above, the gain equalization and automatic level control configurations of FIG. 8 and 10 may be formed as "spliceless" amplifiers, where even modulator 136 of amplifier 120 may be formed from a section of doped fiber. Further, these configurations may be used in combination with the pre-amplifier and power booster configurations to form multistage combinations which provide various desired characteristics.

While the above arrangements are descriptive of various embodiments of the present invention, it is to be understood that there exist various other modifications well-known to those skilled in the art which are considered to fall within the scope of this disclosure. For example, various discrete components are known which may be utilized as wavelength division multiplexers, directional couplers, isolators and modulators. Additionally, while erbium is now considered as the dopant of choice for doped fiber amplifiers, there exist many other materials (such as other rare earth elements, praseodymium, for example) which may be used (for amplification at other signal wavelengths) and which may utilize pump signals at wavelengths other than the exemplary 980 nm and 1480 nm discussed above.

I claim:

1. An arrangement for amplifying an optical communication signal ($S_{in}$) operating at a predetermined wavelength ($\lambda_s$), the arrangement comprising:
    a first doped optical fiber amplifier having first predetermined parameters;
    a second doped optical fiber amplifier having second predetermined parameters;
    a source of an optical pump signal (P) operating at a predetermined wavelength ($\lambda_P$) known to provide amplification of said communication signal within said doped fiber amplifiers; and
    a wavelength division multiplexer including a first port coupled to said first doped optical fiber amplifier, a second port coupled to said second doped optical fiber amplifier, and third and forth ports coupled to said pump signal source in a manner whereby a first pump signal ($P_1$) enters said third port and propagates through said multiplexer so as to be coupled into said first doped fiber amplifier, and a second pump signal ($P_2$) enters said fourth port and propagates through said multiplexer so as to coupled into said second doped fiber amplifier.

2. An arrangement as defined in claim 1 wherein the first and second predetermined parameters include length l of each doped optical fiber amplifier, dopant concentration within each doped optical fiber amplifier, pump signal power and pump signal wavelength.

3. An arrangement as defined in claim 1 wherein the first and second parameters are configured to form a pre-amplifier configuration such that the amplification within the first doped fiber amplifier is less than the amplification within the second doped fiber amplifier.

4. An arrangement as defined in claim 3 wherein the length of the first doped fiber amplifier ($l_1$) is less than the length of the second doped fiber amplifier ($l_2$) in a manner whereby said arrangement operates as a pre-amplifier.

5. An arrangement as defined in claim 4 wherein the first and second doped optical fiber amplifiers comprise erbium-doped fiber amplifiers, $\lambda_p$ is approximately 980 nm, $l_1$ is approximately 1 m and $l_2$ is approximately 5 m.

6. An arrangement as defined in claim 1 wherein the first amplifier parameters are essentially equal to the second amplifier parameters so as to form a power booster amplifier.

7. An arrangement as defined in claim 6 wherein the length of the first doped fiber amplifier ($l_1$) is substantially equal to the length of the second doped fiber amplifier ($l_2$) in a manner whereby said arrangement operates as a power booster.

8. An arrangement as defined in claim 7 wherein the first and second doped optical fiber amplifiers comprise erbium-doped fiber amplifiers, $\lambda_P$ is approximately 980 nm, and $l_1 \approx l_2 \approx 5$ m.

9. An arrangement as defined in claim 1 wherein the first pump signal comprises a wavelength ($\lambda_{P1}$) essentially identical to the wavelength ($\lambda_{P2}$) of the second pump signal.

10. An arrangement as defined in claim 9 wherein the pump signal source comprises two distinct pump source elements, a first source element coupled to the third port of the wavelength division multiplexer and a second source element coupled to the fourth port of the wavelength division multiplexer.

11. An arrangement as defined in claim 9 wherein the pump signal source comprises a single pump source element and means for splitting the output from the single source along a pair of optical signal paths, a first path coupled to the multiplexer third port and a second path coupled to the multiplexer fourth port.

12. An arrangement as defined in claim 11 wherein the splitting means comprises a k ratio coupler, with the value of k controlled to provide the required power split between the first and second signal paths.

13. An arrangement as defined in claim 11 wherein the splitting means is responsive to a second input pump source element.

14. An arrangement as defined in claim 13 wherein the second input pump source is utilized as a spare source element and activated upon failure of the first source element.

15. An arrangement as defined in claim 13 wherein the second input pump source element is utilized simultaneously with the first pump source element to provide increased pump power.

16. An arrangement as defined in claim 1 wherein a first pump signal operates a first pump wavelength ($\lambda_{P1}$) different from the pump wavelength ($\lambda_{P2}$) associated with the second pump signal.

17. An arrangement as defined in claim 16 wherein the first and second doped optical fiber amplifiers comprise erbium-doped fiber amplifiers, $\lambda_{P1}$ is approximately 980 nm and $\lambda_{P2}$ is approximately 1480 nm.

18. An arrangement as defined in claim 1 wherein the pump signal input to the fourth port of the multiplexer is controlled to provide a signal level which varies as a function of time.

19. An arrangement as defined in claim 18 wherein the pump input to the fourth port is maintained below the level required for amplification in a manner whereby the second doped optical fiber amplifier remains un-pumped.

20. An arrangement as defined in claim 18 wherein the pump input to the fourth port is modulated such that the second doped optical fiber amplifier varies between "on" (pumped) and "off" (un-pumped).

21. An arrangement as defined in claim 1 which is defined as spliceless and comprises
   a first section of doped fiber used to form the first doped fiber amplifier, a first signal path through said multiplexer from the first port to the third port, and the optical signal path for the first pump signal; and
   a second section of doped fiber used to form the optical signal path for the second pump signal, a second signal path through said multiplexer from the fourth port to the second port, and the second doped fiber amplifier, said first and second sections of doped fiber fused within the multiplexer to provide the signal paths from the first port to the second port, and the fourth port to the third port.

* * * * *